(12) United States Patent
Paczkowski et al.

(10) Patent No.: US 11,108,637 B1
(45) Date of Patent: Aug. 31, 2021

(54) WIRELESS RELAY CONSENSUS FOR MESH NETWORK ARCHITECTURES

(71) Applicant: T-MOBILE INNOVATIONS LLC, Overland Park, KS (US)

(72) Inventors: Lyle Walter Paczkowski, Mission Hills, KS (US); Tracy Lee Nelson, Overland Park, KS (US); Lyle T. Bertz, Lee's Summit, MO (US); Galip Murat Karabulut, Vienna, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 74 days.

(21) Appl. No.: 16/678,025

(22) Filed: Nov. 8, 2019

(51) Int. Cl.
| | |
|---|---|
| *H04L 12/24* | (2006.01) |
| *H04L 29/06* | (2006.01) |
| *H04W 76/11* | (2018.01) |
| *H04W 8/08* | (2009.01) |
| *H04W 84/20* | (2009.01) |

(52) U.S. Cl.
CPC .......... *H04L 41/0893* (2013.01); *H04L 67/40* (2013.01); *H04W 8/08* (2013.01); *H04W 76/11* (2018.02); *H04W 84/20* (2013.01)

(58) Field of Classification Search
CPC ...... H04L 41/0893; H04L 67/40; H04W 8/08; H04W 76/11; H04W 84/20
See application file for complete search history.

(56) References Cited

U.S. PATENT DOCUMENTS

| | | | |
|---|---|---|---|
| 7,496,078 | B2 | 2/2009 | Rahman |
| 7,808,987 | B2 | 10/2010 | Bauer et al. |
| 8,335,164 | B2 | 12/2012 | Liu |
| 8,416,729 | B2 | 4/2013 | Lo et al. |
| 8,681,693 | B2 | 3/2014 | Kennedy et al. |
| 8,737,267 | B2 | 5/2014 | Horn et al. |
| 8,737,379 | B2 | 5/2014 | Gresset et al. |

(Continued)

FOREIGN PATENT DOCUMENTS

WO  2007053141 A1  5/2007

OTHER PUBLICATIONS

Diego Ongaro, et al; "In Search of an Understandable Consensus Algorithm (Extended Version)"; May 20, 2014; pp. 1-18; Stanford University; U.S.A.

*Primary Examiner* — Brian Whipple
*Assistant Examiner* — James Ross Hollister

(57) ABSTRACT

In a wireless mesh network, a leader relay transfers Remote Procedure Calls (RPCs) to follower relays that indicate leader Identifier (ID), term ID, index, log-entry, and entry command. The follower relays receive the RPCs and enter the log-entry. The leader relay commits the log-entry to a state machine. The state machine generates a mesh architecture that indicates user-access spectrum, relay-interconnect spectrum, and relay-backhaul spectrum. The leader relay transfers RPCs to the follower relays that indicate leader ID, term ID, index, commit command, and the leader mesh architecture. The follower relays receive the RPCs and commit the log-entry to their state machines which generate mesh architectures. The relays wirelessly exchange user data with user devices over the user access spectrum. The relays wirelessly exchange user data with each other over the relay-interconnect spectrum. The relays wirelessly exchange user data with other networks over the relay backhaul spectrum.

20 Claims, 6 Drawing Sheets

(56) References Cited

U.S. PATENT DOCUMENTS

| | | | |
|---|---|---|---|
| 8,774,182 B2 | 7/2014 | Zhang et al. | |
| 8,892,031 B2 | 11/2014 | Ben Hamida et al. | |
| 8,948,046 B2 | 2/2015 | Kang et al. | |
| 9,288,719 B2 | 3/2016 | Hui et al. | |
| 9,980,155 B2 | 5/2018 | Rahman | |
| 10,158,555 B2 | 12/2018 | Ghosh et al. | |
| 10,205,507 B2* | 2/2019 | Madaiah | H04B 7/15528 |
| 10,206,161 B2 | 2/2019 | Whelan et al. | |
| 10,361,843 B1* | 7/2019 | Suthar | H04L 9/3247 |
| 2014/0052771 A1* | 2/2014 | Anantharam | G06F 9/547 |
| | | | 709/203 |
| 2015/0070187 A1 | 3/2015 | Wiesner et al. | |
| 2015/0271303 A1* | 9/2015 | Neginhal | H04L 49/70 |
| | | | 370/392 |
| 2015/0382275 A1 | 12/2015 | Pragada et al. | |
| 2016/0218948 A1* | 7/2016 | Djukic | H04L 43/0876 |
| 2018/0063827 A1 | 3/2018 | Soysal et al. | |
| 2018/0302793 A1* | 10/2018 | Paczkowski | H04W 76/11 |
| 2019/0312784 A1* | 10/2019 | Altay | H04L 41/12 |
| 2020/0045139 A1* | 2/2020 | Gupta | H04L 43/0811 |
| 2020/0052954 A1* | 2/2020 | Han | H04L 41/0668 |
| 2020/0065176 A1* | 2/2020 | Halliday | G06F 11/3476 |
| 2020/0225643 A1* | 7/2020 | Tugbo | G05B 19/4155 |
| 2020/0295997 A1* | 9/2020 | Kotalwar | H04L 63/0876 |
| 2021/0011753 A1* | 1/2021 | Opsenica | G06F 9/45558 |

* cited by examiner

WIRELESS RELAY CONSENSUS FOR MESH NETWORK ARCHITECTURES

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

The wireless protocols transport network signaling and user data between the wireless user devices and the wireless access nodes. The wireless access nodes exchange corresponding network signaling and user data with wireless network cores. An exemplary wireless network core comprises a Network Function Virtualization Infrastructure (NFVI) that executes Virtual Network Functions (VNFs). To extend the range of their wireless data services, the wireless communication networks also deploy wireless relays.

The wireless relays exchange wireless signals with the wireless user devices. The wireless relays also exchange wireless signals with the wireless access nodes. Thus, the wireless relays wirelessly exchange user data between the wireless user devices and the wireless access points to extend the wireless range of the data services. In many deployments, the wireless relays link together to form relay networks. For example, relay chains are relatively linear and often follow roads. Relay mesh networks can take various physical forms and are used to cover areas like a factories, stadiums, schools, and the like.

Consensus algorithms are used to control groups of host machines in a fault-tolerant and data-cohesive manner. Consensus algorithms are resident in each host machine and implement replicated state machines in the host machines. The host machines can maintain a common state using the replicated state machines even after the loss of several host machines. The consensus algorithms check state machine inputs and outputs to maintain a single redundant data store in all of the host machines.

Distributed ledgers are used to handle transactional data like account balances by using a blockchain format. A distributed ledger has multiple geographically-diverse computer nodes that each have a copy of chain code and data blocks. The computer nodes execute the chain code to test and build consensus on the results of chain code execution. For example, multiple computer nodes each execute chain code to determine a user's new balance after a debit and then build a consensus on the new balance before proceeding. Once a consensus is reached, then the computer nodes each store a new data block in their own blockchain database. The data block indicates chain code results and has a hash of the previous data block. The redundancy, consensus, and hashes make the distributed ledger highly reliable, secure, and visible.

Unfortunately, the consensus algorithms do not efficiently control groups of wireless relays that dynamically form wireless mesh networks. Moreover, the consensus algorithms do not effectively use distributed ledgers to control the wireless relays in the wireless mesh networks.

TECHNICAL BACKGROUND

In a wireless mesh network, a leader relay transfers Remote Procedure Calls (RPCs) to follower relays that indicate a leader Identifier (ID), term ID, index, log-entry, and entry command. The follower relays receive the RPCs and enter the log-entry. The leader relay commits the log-entry to a state machine. The state machine generates a mesh architecture that indicates user-access spectrum, relay-interconnect spectrum, and relay-backhaul spectrum. The leader relay transfers RPCs to the follower relays that indicate leader ID, term ID, index, commit command, and the leader mesh architecture. The follower relays receive the RPCs and commit the log-entry to their state machines which generate mesh architectures. The relays wirelessly exchange user data with user devices over the user access spectrum. The relays wirelessly exchange user data with each other over the relay-interconnect spectrum. The relays wirelessly exchange user data with other networks over the relay backhaul spectrum.

DETAILED DESCRIPTION

Figure 1:
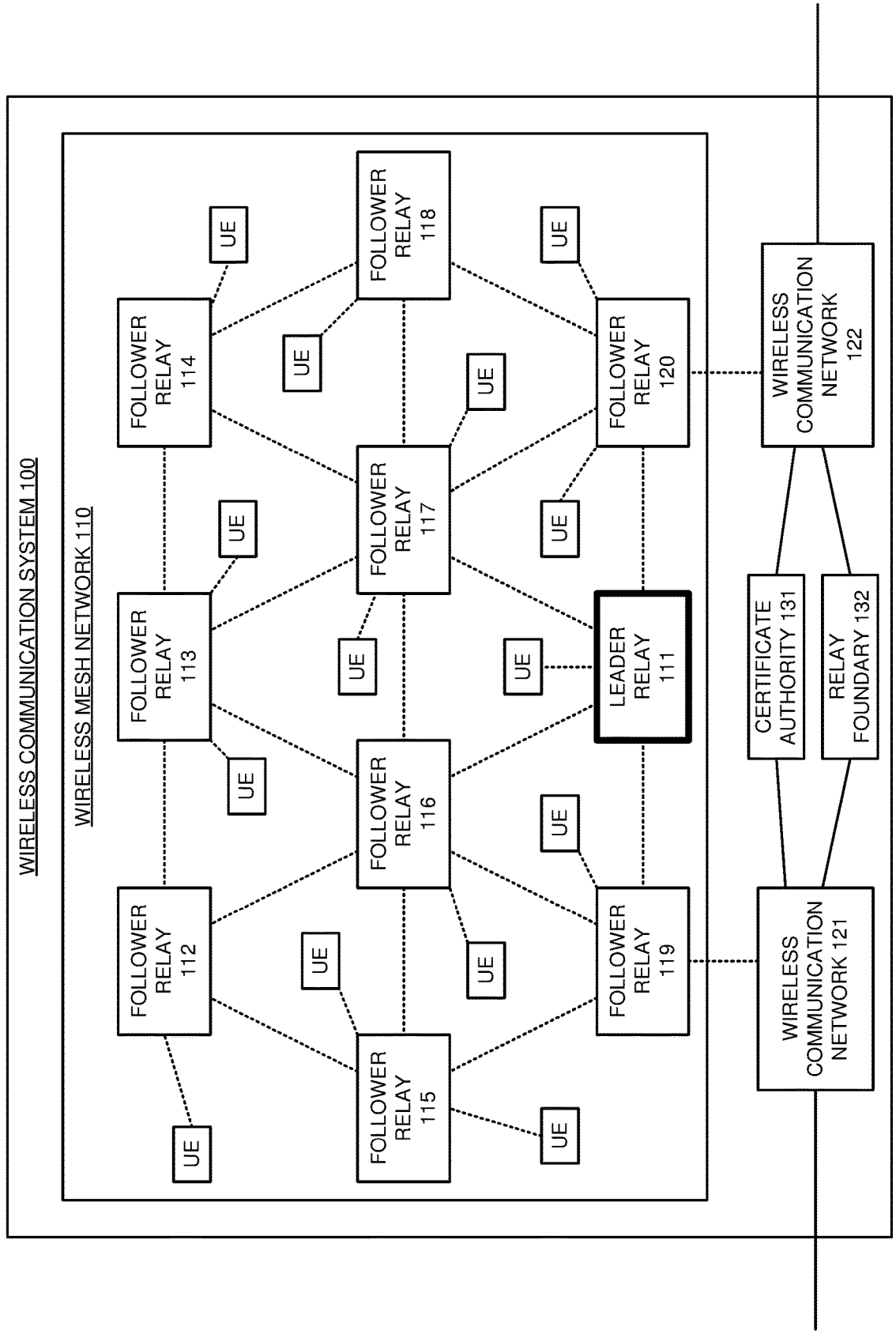
FIG. 1 illustrates a wireless communication system comprised of wireless relays that host replicated state machines to determine mesh network architectures.

FIG. 1 illustrates wireless communication system 100 comprised of wireless relays 111-120 that host replicated state machines that determine mesh network architectures. The mesh network architectures indicate the wireless connections for wireless relays 111-120. The mesh network architectures indicate the wireless spectrum for access, interconnection, and backhaul. The mesh network architectures may also indicate hardware-trust requirements, relay configuration updates, relay mobility, or some other network characteristics.

Wireless communication system 100 comprises wireless mesh network 110, wireless communication networks 121-122, certificate authority 131, and relay foundry 132. Wireless mesh network 100 comprises User Equipment (UEs) and wireless relays 111-120. The UEs might be phones, computers, robots, sensors, vehicles, or some other data appliance with wireless communication circuitry. Wireless mesh network 110 is linked to wireless communication networks 121-122. Wireless communication networks 121-122 comprise wireless access nodes, data routers, and network controllers. Wireless networks 121-122 are linked to certificate authority 131 and relay foundry 132 over network connections.

The UEs and wireless relays 111-120 are connected over wireless access links that use the specific user-access spectrum that is specified by the current mesh architecture. Wireless relays 111-120 are interconnected over wireless interconnect links that use relay-interconnect spectrum, and the specific links and spectrum are specified by the current mesh architecture. For example, the current mesh architecture indicates that follower relay 112 is interconnected to follower relays 113, 115, and 116 over specific frequency bands—and that follower relay 112 is not connected to other wireless relays. Wireless relays 119-120 and wireless networks 121-122 are connected over wireless backhaul links that use the specific relay-backhaul spectrum, and the links and spectrum are specified by the current mesh architecture. For example, the current mesh architecture indicates that follower relays 119-120 are connected to respective wireless networks 121-122, and that the other relays 111-118 are not connected to wireless networks 121-122.

The wireless links may use Fifth Generation New Radio (5GNR), Institute of Electrical and Electronic Engineers (IEEE) 802.11 (WIFI), Long Term Evolution (LTE), Low-Power Wide Area Network (LP-WAN), or some other wireless communication protocol. The wireless links may use frequencies in the low-band, mid-band, high-band, or some other part of the electromagnetic spectrum. The mesh network architectures specify specific frequencies, channels, and/or bands of the electromagnetic spectrum. The network connections may use IEEE 802.3 (Ethernet), Time Division Multiplex (TDM), Data Over Cable System Interface Specification (DOCSIS), Internet Protocol (IP), 5GNR, WIFI, LTE, or some other data communication protocol.

Wireless relays 111-120 comprise microprocessors, memory, software, transceivers, and bus circuitry. The microprocessors comprise Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems and network applications. The network applications include consensus applications and replicated state machines. The consensus applications have consensus algorithms. The transceivers include antennas, amplifiers, filers, modems, analog/digital interfaces, Digital Signal Processors (DSPs), memory, and bus circuitry. The microprocessors execute the software to drive the transceivers to wirelessly exchange user data among the UEs and between the UEs and wireless networks 121-122.

Certificate authority 131 and relay foundry 132 comprise computer systems with microprocessors, memory, software, and bus circuitry. In certificate authority 131, the microprocessors execute the software to validate hardware-trust and issue hardware-trust certificates to wireless relays 111-120. In relay foundry 132, the microprocessors execute the software to issue software and data updates to wireless relays 111-120. In some examples, certificate authority 131 and relay foundry 132 comprise Virtual Network Functions (VNFs) that execute in Network Function Virtualization Infrastructures (NFVIs). In some examples, certificate authority 131 and relay foundry 132 comprise distributed ledgers. The distributed ledgers may comprise VNFs executing in the NFVIs.

Initially, wireless relays 111-120 are individually positioned and booted as follower relays that implement a trusted execution environment and an open execution environment. The trusted execution environment has trusted processors, memory, software, and bus circuitry. The open execution environment has open processors, memory, software, and bus circuitry. The trusted execution environment asserts device control and manages the open execution environment. New follower relays use their open execution environment and default spectrum to discover and attach to other relays. During this initial period, leader elections are held and new relays are added. Mesh architectures are determined and implemented. Some wireless relays 111-120 may attach to wireless networks 121-122 using the relay-backhaul spectrum per the mesh architectures.

At the end of this initial period, wireless relays 111-120 are all operating, and wireless relay 111 is a follower relay that detects a term time-out and transitions from follower to candidate—typically before other relays 112-120. As a candidate, wireless relay 111 transfers election Remote Procedure Calls (RPCs) to wireless relays 112-120 that indicate its candidate Identifier (ID), the new term ID, and a leader election request. Wireless relays 112-120 receive the election RPCs and typically transfer positive votes in RPC responses to the only candidate—wireless relay 111. Wireless relay 111 receives positive votes from most or all wireless relays 112-120 and responsively transitions from candidate to leader. As the new leader, leader relay 111, transfers heartbeat RPCs to follower relays 112-120 that indicate the leader ID, the term ID, and a leader index. Follower relays 112-120 respond to heartbeat RPCs (and/or other RPCs) with updates to their relay status. The relay status indicates wireless detachments, wireless attachments, detected wireless signals, detected signal strengths, and other metadata for the UEs, relays 111-120, and networks 121-222.

Leader relay 111 identifies a network service that will be delivered over wireless mesh network 100. The network service may be a mode like start-up, normal, critical, busy, skeleton, and the like. The network service may be a user application like machine-control, internet-access, content-streaming, media-conferencing, and the like.

Leader relay 111 enters a log-entry. Leader relay 111 transfers entry RPCs to follower relays 112-120 that indicate the network service, leader ID, term ID, index, and log-entry. Follower relays 112-120 receive the entry RPCs and enter the log-entry Follower relays 112-120 may respond to the entry RPCs with updates to their relay status.

Leader relay 111 commits the log-entry to its state machine. The leader's state machine executes based on term ID, relay status, and selected service to responsively generate the mesh architecture that is shown on FIG. 1. The mesh architecture specifies the specific user-access spectrum between the UEs and wireless relays 111-120. The mesh architecture specifies the specific interconnections and relay-interconnect spectrum between wireless relays 111-120. The mesh architecture specifies the specific connections and relay-backhaul spectrum between wireless relays 111-120 and wireless networks 121-122.

Leader relay 111 transfers commit RPCs to follower relays 112-120 that indicate the leader mesh architecture, relay status, leader ID, term ID, index, and commit command. Follower relays 112-120 receive the commit RPCs and responsively commit their log-entries to their state machines. The follower state machines execute based on term ID, relay status, and selected service to responsively generate the mesh architecture that is shown on FIG. 1.

Follower relays 112-120 compare the leader mesh architecture to their own follower mesh architectures and report any inconsistencies to leader relay 111. Follower relays 112-120 use their own follower mesh architectures to check the leader mesh architecture, but follower relays 112-120 use the leader mesh architecture to serve the UEs. At this point, wireless relays 111-120 operate using the mesh architecture depicted in FIG. 1. Wireless relays 111-120 wirelessly exchange user data with the UEs over the user-access spectrum. Wireless relays 111-120 wirelessly exchange user data with each other over the relay-interconnect spectrum. Wireless relays 119-120 wirelessly exchange user data with wireless communication networks 121-122 over the relay-backhaul spectrum.

In some cases, a mesh architecture specifies a hardware-trust requirement for wireless relays 111-120. For example, leader relay 111 may select a "security-critical" network service, and the state machines responsively generate a mesh architecture with a hardware-trust requirement to support the "security-critical" service. In response to the hardware-trust requirement in the mesh architecture, wireless relays 111-120 implement hardware-trust to extend their trusted execution environments across wireless mesh network 100. In response to the hardware-trust requirement, wireless relays 111-120 obtain hardware-trust certificates from certificate authority 131.

To obtain a hardware-trust certificate, the trusted execution environment in leader relay 111 transfers a hardware-trust request to certificate authority 131 and receives a random number in return. The trusted execution environment in leader relay 111 hashes the random number with its unique hardware-trust code that is physically embedded in trusted read-only memory. Leader relay 111 transfers its hash to certificate authority 131. Certificate authority 131 hashes the same hardware-trust code and random number to match the hash from leader relay 111 and validate hardware-trust of leader relay 111. Certificate authority 131 transfers a hardware-trust certificate to leader relay 111 that indicates hardware-trust for relay 111 and that is signed with a private key for certificate authority 131. The hardware-trust certificate has a short time-to-live that may be limited to a specific term or index. Follower relays 112-120 obtain hardware-trust certificates in a similar manner. In some examples, the UEs, networks 121-122, and foundry 132 may also obtain their own hardware-trust certificates.

The trusted execution environments in wireless relays 111-120 exchange their hardware-trust certificates among the interconnected relays over the designated spectrum to verify the current mesh architecture. The trusted execution environments in wireless relays 111-120 receive and validate the hardware-trust certificates based on the public key for certificate authority 131. Per the mesh architecture, the trusted execution environments in wireless relays 111-120 execute trusted consensus applications and trusted state machines. The RPCs and responses transport hardware-trust certificates. The trusted execution environments interact with other relays and devices that provide valid hardware-trust certificates. The trusted execution environments refuse to interact with relays and devices that cannot provide valid hardware-trust certificates when the current mesh architecture requires hardware-trust. The trusted execution environments will isolate and ignore RPCs and responses without valid hardware-trust certificates. The trusted execution environments in wireless relays 111-120 report failures of hardware-trust and deviations from the current mesh architecture.

In some cases, the mesh architecture specifies a relay update requirement for wireless relays 111-120. For example, leader relay 111 may select a "start-up" network service, and the leader state machine may responsively generate a mesh architecture with a relay update requirement. In response to the relay update requirement in the mesh architecture, wireless relays 111-120 obtain software and/or data updates from relay foundry 132. The updates may comprise new consensus applications and/or new state machines.

To obtain a relay update, leader relay 111 transfers an update request to relay foundry 132 and receives a new software and data in return. Leader relay 111 installs the new software and stores the new data. Follower relays 112-120 obtain relay updates in a similar manner. The relay updates may be combined with hardware-trust, so wireless relays 111-120 and/or relay foundry 132 would require valid hardware-trust certificates before implementing the relay update.

In some cases, the mesh architecture allows mobility for wireless relays 111-120. For example, leader relay 111 may select a "manufacturing control" service, and the state machines may then generate a mesh architecture that supports relay mobility. Without the mobility feature in the mesh architecture, wireless relays 111-120 do not attempt or accept detachments and attachments that differ from the mesh architecture. The mobility feature in the mesh architecture allows wireless relays 111-120 to detach and attach per the mesh architecture. Wireless relays 111-120 report relay mobility information to leader relay 111 which then updates the mesh architecture.

To support relay mobility, leader relay 111 receives mobility information (detachments/attachments) from follower relays 111-120 in RPC responses. Leader relay 111 transfers the mobility information to followers relays 112-120 in entry and/or commit RPCs. For example, follower relay 112 may detach from relays 115-116 and attach to relay 114 as it moves around per the current mesh architecture. Follower relays 112 and 114-116 all assist and report the detachments/attachments to leader relay 111 in response to the mobility feature for relay 112 in the current mesh architecture.

Leader relay 111 transfers entry RPCs to the follower relays 111-120 that indicate relay status/mobility information, network service, leader ID, term ID, index, and log-entry to implement the new mesh architecture. Follower relays 112-120 receive the entry RPCs and enter the log-entry. Leader relay 111 then commits the log-entry to its state machine. The leader's state machine executes based on term ID, relay status/mobility information, and selected service to responsively generate a mesh architecture that accounts for the detachments/attachments. In particular, the new mesh architecture specifies the interconnections and spectrum between the mobile relay and the other relays and wireless networks.

Leader relay 111 transfers commit RPCs to follower relays 112-120 that indicate the relay status/mobility, mesh architecture, leader ID, term ID, index, and commit command. Follower relays 112-120 receive the commit RPCs and responsively commit the log-entry to their state machines. The state machines execute based on term ID, relay status/mobility, and selected service to responsively generate new mesh architecture to cross-check the leader architecture. The relay mobility feature may be combined with hardware-trust and/or relay update requirements.

Advantageously, wireless communication system 100 features a consensus application that efficiently and effectively controls wireless relays 111-120 in wireless mesh network 110.

Figure 2:
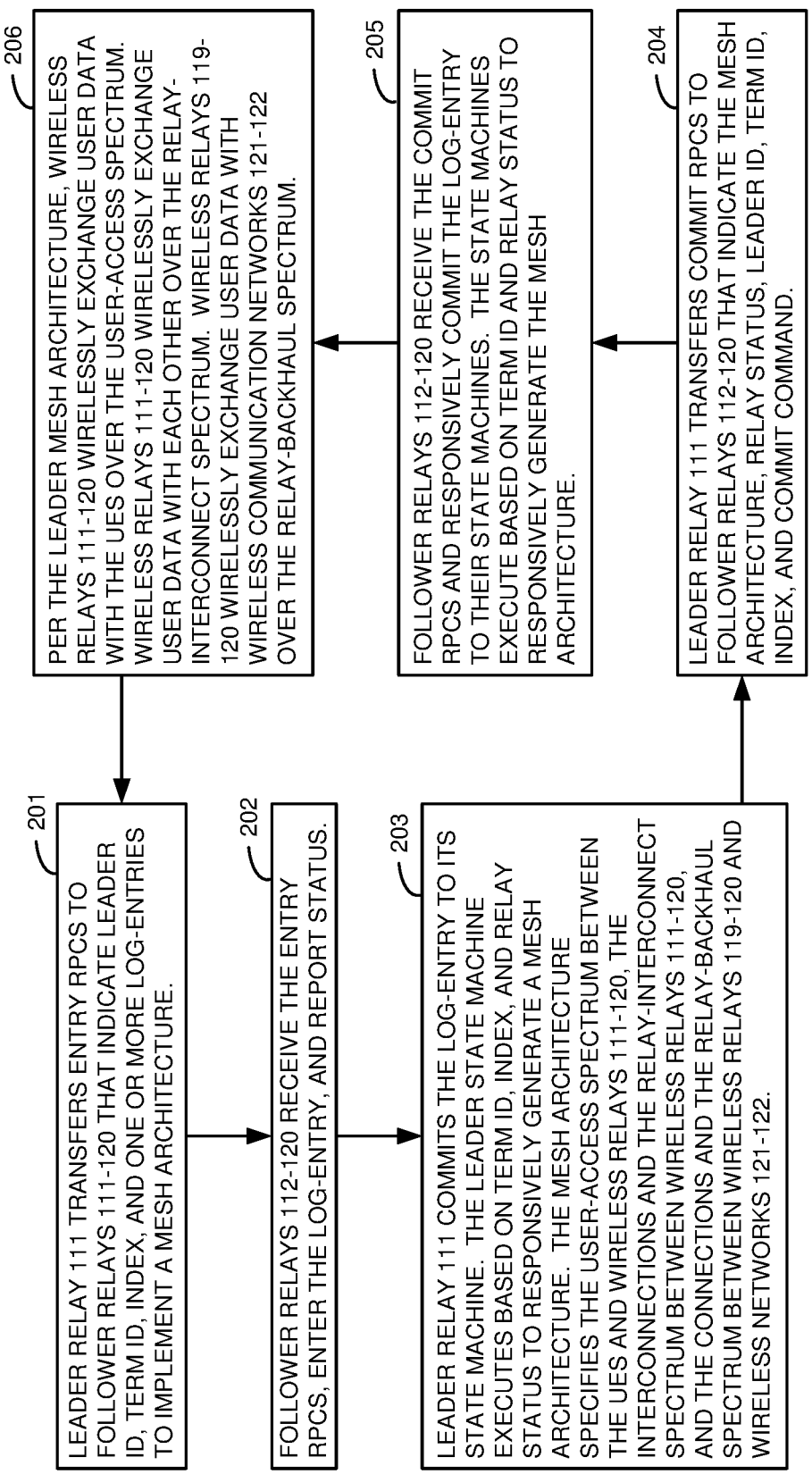
FIG. 2 illustrates the operation of the wireless communication system having the wireless relays that host the replicated state machines to determine the mesh network architectures.

FIG. 2 illustrates the operation of wireless communication system 100 having wireless relays 111-120 that host the replicated state machines to determine the mesh network architectures. Leader relay 111 transfers entry RPCs to follower relays 111-120 that indicate the leader ID, term ID, index, and one or more log-entries to implement a mesh architecture (201). Follower relays 112-120 receive the entry RPCs and enter the log-entry (202). Follower relays 112-120 respond to the entry RPCs with their current relay status.

Leader relay 111 then commits the log-entry to its state machine (203). The leader's state machine executes based on term ID and relay status to responsively generate the mesh architecture that is shown on FIG. 1. The mesh architecture specifies the frequencies of the user-access spectrum between the UEs and wireless relays 111-120. The mesh architecture specifies the interconnections and the frequencies of the relay-interconnect spectrum between wireless relays 111-120. The mesh architecture specifies the connections and the frequencies of the relay-backhaul spectrum between wireless relays 119-120 and wireless networks 121-122.

Leader relay 111 transfers commit RPCs to follower relays 112-120 that indicate the leader mesh architecture, relay status, leader ID, term ID, index, and commit command (204). Follower relays 112-120 receive the commit RPCs and responsively commit the log-entry to their state machines (205). The follower state machines execute based on term ID and relay status to responsively generate the mesh architecture that is shown on FIG. 1. Follower relays 112-120 compare the leader mesh architecture to their own follower mesh architectures and report inconsistencies to leader relay 111. Follower relays 112-120 user the leader mesh architecture to serve the UEs and not their follower mesh architectures.

Wireless relays 111-120 now operate using the mesh architecture depicted in FIG. 1 (206). Wireless relays 111-120 wirelessly exchange user data with the UEs over the user-access spectrum. Wireless relays 111-120 wirelessly exchange some user data with each other over the relay-interconnect spectrum. Wireless relays 119-120 wirelessly exchange some user data with wireless communication networks 121-122 over the relay-backhaul spectrum. The operation repeats (201).

Figure 3:
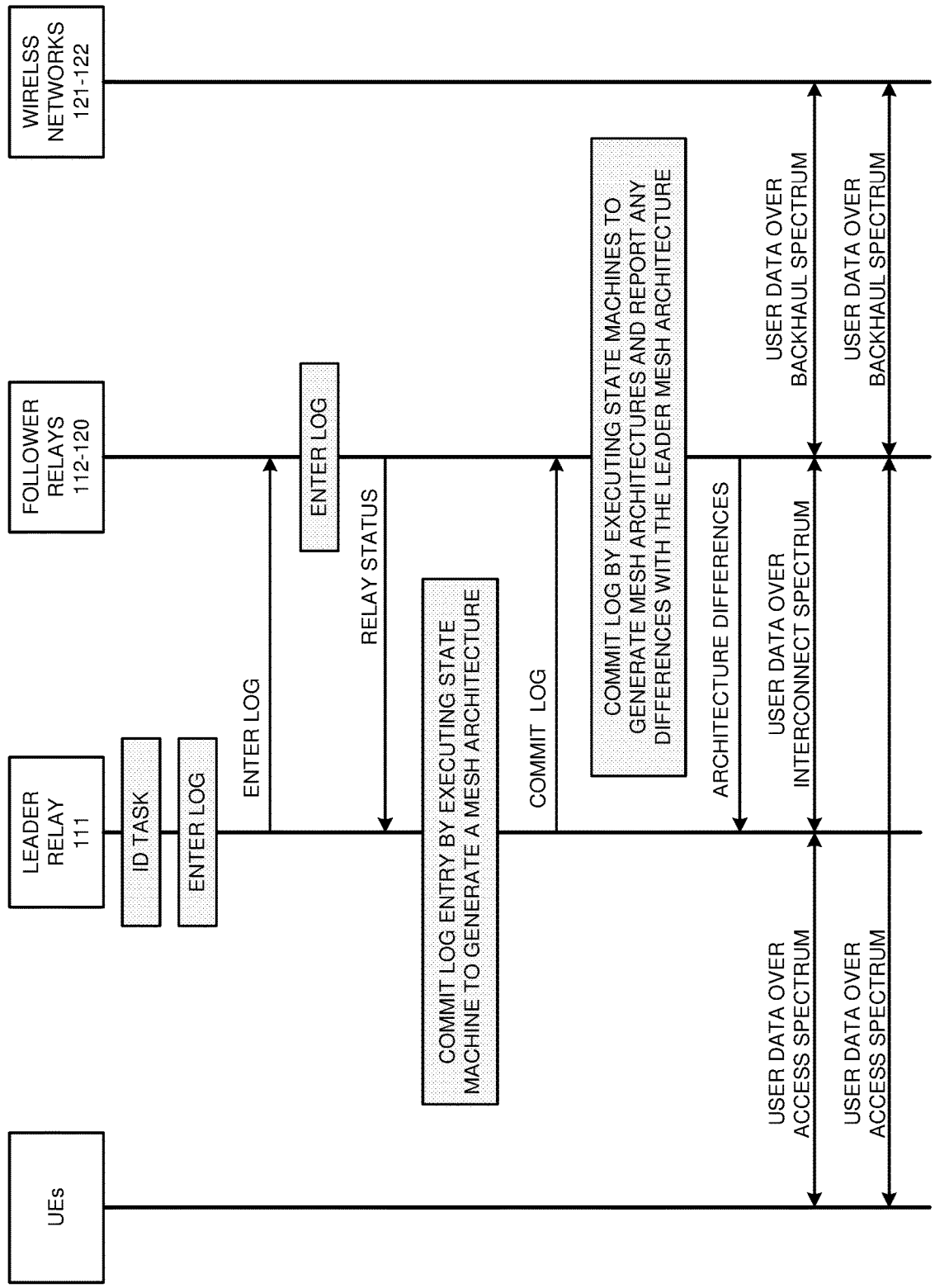
FIG. 3 illustrates the operation of the wireless communication system having the wireless relays that host the replicated state machines to determine the mesh network architectures.

FIG. 3 illustrates the operation of wireless communication system 100 having wireless relays 111-120 that host the replicated state machines to determine the mesh network architectures. Leader relay 111 determines a task like "update architecture" and responsively enters an update architecture log-entry into the current index for the leader state machine. Leader relay 111 transfers entry RPCs to follower relays 112-120 that indicate the leader ID, term ID, index, and log-entry to update the mesh architecture. Follower relays 112-120 receive the entry RPCs and enter the log-entry. Follower relays 112-120 respond to the entry RPCs with their current relay status.

Leader relay 111 then commits the log-entry to its state machine. The leader's state machine executes based on the term ID and relay status to responsively update the mesh architecture. The mesh architecture specifies the frequencies of the user-access spectrum between the UEs and wireless relays 111-120. The mesh architecture specifies the interconnections and the frequencies of the relay-interconnect spectrum between wireless relays 111-120. The mesh architecture specifies the connections and the frequencies of the relay-backhaul spectrum between wireless relays 119-120 and wireless networks 121-122.

Leader relay 111 transfers commit RPCs to follower relays 112-120 that indicate the leader mesh architecture, relay status, leader ID, term ID, index, and commit command. Follower relays 112-120 receive the commit RPCs and responsively commit the log-entry to their state machines. The follower state machines execute based on term ID and relay status to responsively generate mesh architectures. Follower relays 112-120 compare the leader mesh architecture to their own follower mesh architectures and report inconsistencies to leader relay 111. Leader relay 111 exchanges RPCs and responses with follower relays that have data inconsistencies, and the follower relays overwrite their inconsistencies with leader data. Thus, wireless relays 111-120 effectively maintain duplicate data stores in each relay.

Per the leader mesh architecture, wireless relays 111-120 wirelessly exchange user data with the UEs over the user-access spectrum. Per the leader mesh architecture, wireless relays 111-120 wirelessly exchange user data with each other over the relay-interconnect spectrum. Wireless relays 119-120 wirelessly exchange user data with wireless communication networks 121-122 over the relay-backhaul spectrum.

Figure 4:
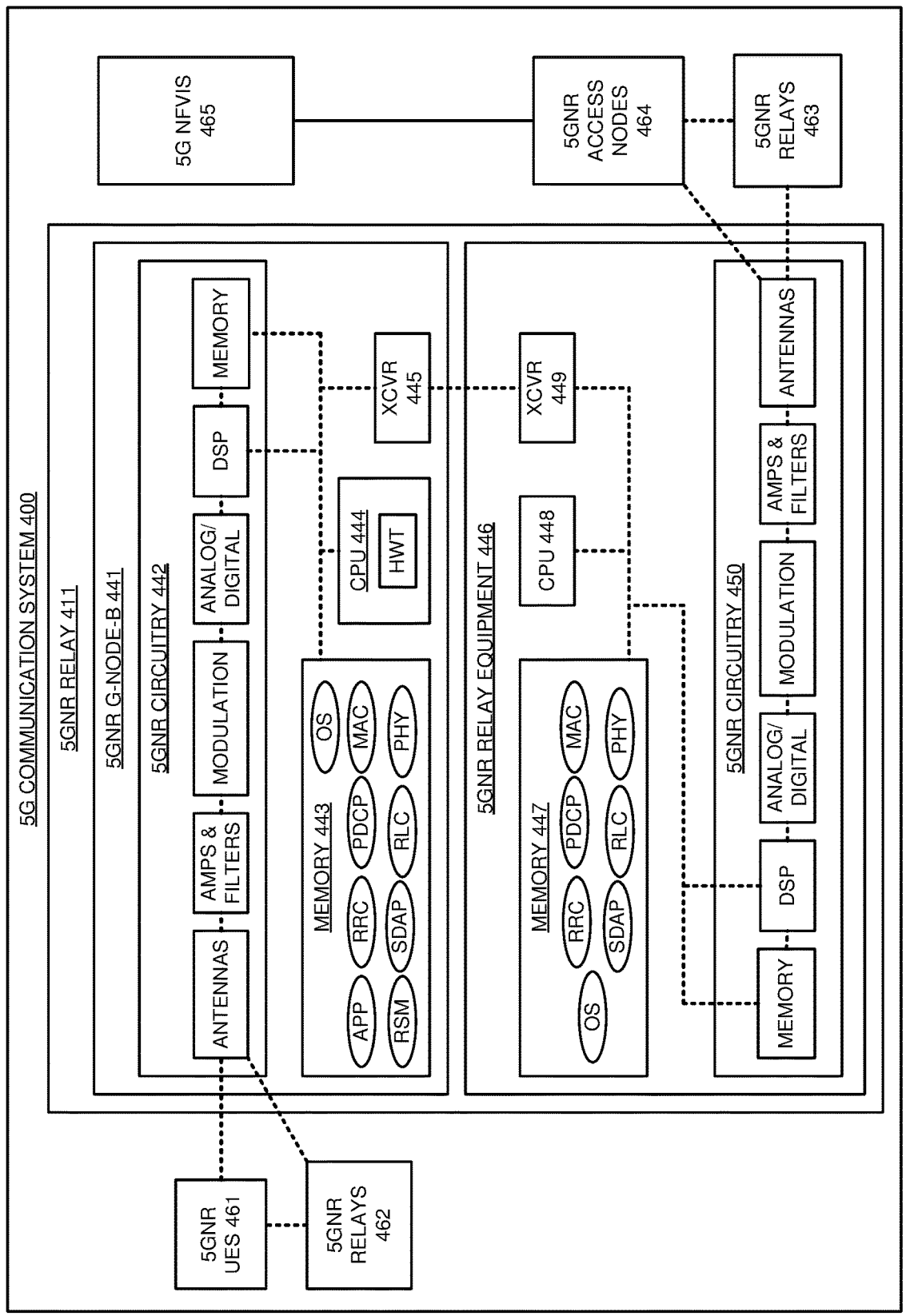
FIG. 4 illustrates a Fifth Generation New Radio (5GNR) wireless relay that hosts a replicated state machine to determine mesh architectures for a wireless mesh network in a Fifth Generation (5G) communication system.

FIG. 4 illustrates Fifth Generation New Radio (5GNR) 5GNR relay 411 that hosts a replicated state machine to determine mesh architectures for a wireless mesh network in Fifth Generation (5G) communication system 400. 5G communication system 400 comprises 5GNR relay 411, 5GNR UEs 461, 5GNR relays 462-463, 5GNR access nodes 464, and 5G Network Function Virtualization Infrastructures (NFVIs) 465. 5GNR relay 411 comprises an example of wireless relays 111-120, although relays 111-120 may differ. 5GNR relay 411 comprises 5GNR gNodeB 441 and 5GNR relay equipment 446 that are coupled together—perhaps by an ethernet switch.

5GNR gNodeB 441 comprises 5GNR circuitry 442, memory 443, Central Processing Units (CPU) 444, and Transceiver (XCVR) 445 that are coupled over bus circuitry. CPU 444 is configured with multiple cores, processors, and the like to operate both trusted and open execution environments. The trusted execution environment in CPU 444 has a physically-embedded read-only hardware-trust code (HWT). 5GNR circuitry 442 comprises antennas, amplifiers (AMPS), filters, modulation, analog-to-digital interfaces, Digital Signal Processors (DSP), and memory that are coupled over bus circuitry. 5GNR relay equipment 446 comprises memory 447, CPU 448, XCVR 449, and 5GNR circuitry 450 that are coupled over bus circuitry. 5GNR circuitry 405 comprises antennas, amplifiers, filters, modulation, analog-to-digital interfaces, DSP, and memory that are coupled over bus circuitry.

The antennas of 5GNR gNodeB 441 are wirelessly linked to UEs 461 over user-access spectrum and are wirelessly linked to 5GNR relays 462 over relay-interconnect spectrum. The antennas of 5GNR relay equipment 446 are wirelessly linked to 5GNR relays 463 over relay-interconnect spectrum and are wirelessly linked to 5GNR access nodes 464 over relay-backhaul spectrum. 5GNR access nodes 464 are linked to 5G NFVIs 465 over network links.

In 5GNR gNodeB 441, memory 443 stores an operating system (OS) and several network applications. The network applications comprise a consensus application (APP), Replicated State Machine (RSM), Physical Layer (PHY), Media Access Control (MAC), Radio Link Control (RLC), Packet Data Convergence Protocol (PDCP), Radio Resource Control (RRC), and Service Data Adaptation Protocol (SDAP). In relay equipment 446, memory 447 stores an operating system and network applications (PHY, MAC, RLC, PDCP, RRC, and SDAP). CPU 444 executes the consensus application and the replicated state machine to participate in elections, determine mesh architectures, and the like. CPU 444 executes the PHY, MAC, RLC, PDCP, RRC, and SDAP to exchange data and signaling with UEs 461 and relays 462 and to exchange data and signaling with NFVIs 465 over 5GNR relay equipment 446 and 5GNR access nodes 464.

The RRC in 5GNR relay equipment 446 exchanges RRC/N1 signaling with an RRC in 5GNR access nodes 464 over 5GNR circuitry 450 and the relay-backhaul spectrum. The RRC in 5GNR access nodes 464 exchanges corresponding N2/N1 signaling with an Access and Mobility Management Function (AMF) in 5G NFVIs 465. The SDAP in relay equipment 446 can then exchange SDAP data with 5GNR access nodes 464 over 5GNR circuitry 450 and the relay-backhaul spectrum. 5GNR access nodes 464 can exchange corresponding N3 data with a User Plane Function (UPF) in 5G NFVIs 465.

The RRC in 5GNR gNodeB 441 exchanges RRC/N1 signaling with the RRCs in UEs 461 over user-access spectrum and with the RRCs in 5GNR relays 462 over relay-interconnect spectrum. The RRC in 5GNR gNodeB 441 exchanges corresponding N2/N1 signaling with AMFs in 5G NFVIs 465 over 5GNR relay equipment 446, the relay-backhaul spectrum, and 5GNR access nodes 464. The SDAPs in UEs 461 can then exchange SDAP data with the SDAP in 5GNR gNodeB 441 over user-access spectrum. The SDAPs in 5GNR relays 462 can exchange SDAP data with the SDAP in 5GNR gNodeB 441 over relay-interconnect spectrum. The SDAP in 5GNR gNodeB 441 can exchange corresponding N3 data with UPFs in 5G NFVIs 465 over 5GNR relay equipment 446, the relay-backhaul spectrum, and 5GNR access nodes 464.

In 5GNR circuitry 442, the antennas receive Uplink (UL) wireless signals that transport RRC/N1 signaling and SDAP data from UE 461 over user-access spectrum and from 5GNR relays 462 over relay-interconnect spectrum. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSP. The DSP recovers UL 5GNR symbols from the UL digital signals. The CPU executes the network applications to process the UL 5GNR symbols and recover the UL signaling and SDAP data. CPU 444 executes the network applications to process the UL and Downlink (DL) signaling to generate new UL and DL signaling. CPU 444 executes the network applications to interwork SDAP data and N3 data.

In 5GNR relay equipment 446, CPU 448 executes the network applications to process the UL N2/N1 signaling and N3 data to generate corresponding UL 5GNR symbols. In 5GNR circuitry 450, the DSP processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequencies. The amplifiers boost the modulated UL signals for the filters which attenuate unwanted out-of-band energy. The filters transfer the filtered UL signals through duplexers to the antennas. The electrical UL signals drive the antennas to emit corresponding RRC/N1 and SDAP signals to 5GNR access nodes 464 and 5GNR relays 463 over the relay backhaul and interconnect spectrum. The UL wireless signals transport UL N2/N1 signaling and N3 data for the AMFs and UPFs in 5G NFVIs 465.

In 5GNR circuitry 450, the antennas receive DL RRC/N1 and SDAP signals from 5GNR access nodes 464 and 5GNR relays 463. The DL wireless signals transport DL N2/N1 signaling and N3 data from the AMFs and UPFs in 5G NFVIs 465. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the DSP. The DSP recovers DL 5GNR symbols from the DL digital signals. CPU 448 executes the network applications to process the DL 5GNR symbols and recover the DL N2/N1 signaling and N3 data. CPU 448 executes the network applications to process the UL and DL signaling to generate new UL and DL signaling. CPU 448 transfers the DL N2/N1 signaling and N3 data to 5GNR gNodeB 441.

In 5GNR gNodeB 442, CPU 444 executes the network applications to process the DL N2/N1 signaling and N3 data to generate corresponding DL 5GNR symbols. In 5GNR circuitry 442, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless signals that transport the DL RRC/N1 signaling and SDAP data to UEs 461 over user-access spectrum and to 5GNR relays 462 over relay interconnect spectrum.

5GNR relay 411 may communicate with 5G NFVIs 465 over 5GNR relays 463 and 5GNR access nodes 464 in the same manner as 5GNR relays 462 communicate with 5G NFVIs 465 over 5GNR relay 411 and 5GNR access nodes 464. 5GNR relays 463 may communicate with 5G NFVIs 465 over 5GNR relay 411 and 5GNR access nodes 464 in the same manner as 5GNR relays 462 communicate with 5G NFVIs 465 over 5GNR relay 411 and 5GNR access nodes 464.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/

Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Initially, 5GNR relay 411 is positioned and booted as a follower relay that first implements a trusted execution environment, and under then the control of the trusted execution environment, implements an open execution environment. The trusted execution environment has a set of trusted CPUs, memory, software, and bus circuitry. The open execution environment has standard CPUs, memory, software, and bus circuitry. As a new follower, 5GNR relay 411 uses the open execution environment and default spectrum to discover and attach to other relays and access nodes. During this initial period, leader elections may be held as new relays are added and new mesh architectures are followed.

At the end of the initial period, CPU 444 in 5GNR gNodeB 441 in 5GNR relay 411 executes the consensus application, and the consensus application detects a term time-out. The consensus application responsively transitions to from follower to candidate. As a candidate, the consensus application transfers election RPCs that indicate a candidate ID, new term ID, and leader election request to the consensus applications in the other wireless relays. In the other wireless relays, at least a majority of the consensus applications vote for 5GNR relay 411.

In 5GNR relay 411, the consensus application receives the positive votes from most or all of the other wireless relays and transitions from candidate to leader. As the new leader, the consensus application in 5GNR relay 411 transfers heartbeat RPCs to the follower relays that indicate the leader ID, term ID, and leader index among other data. In the follower relays, the consensus applications responds to heartbeat RPCs with relay status updates if any. The relay status characterizes the wireless attachments, signal strengths, CPU occupancy, buffer fill, data transfer rates and amounts, and other performance data.

The consensus application in relay 411 identifies a network service that will be delivered over the mesh network. The network service may be a mode like start-up, normal, critical, busy, skeleton, and the like. The network service may be an application like manufacturing, financial-transaction, content-streaming, media-conferencing, and the like. The network service may be selected based on a time schedule, user input, machine request, or some other trigger.

The consensus application in wireless relay 411 enters a log-entry for a new mesh architecture to an index ID. In the follower relays, the consensus applications receive the entry RPCs and enter the log-entry. The consensus applications respond to the entry RPCs with any relay status updates. The consensus application in wireless relay 411 transfers entry RPCs to the follower relays that indicate the network service, relay status, leader ID, term ID, index, and log-entry. In the follower relays, the consensus applications receive the entry RPCs and enter the log-entry. The consensus applications respond to the entry RPCs with any relay status updates.

The consensus application in wireless relay 411 commits the log-entry to the leader state machine. The leader state machine executes based on term ID, relay status, and selected service to determine a mesh architecture. For example, the state machine may enter a data structure with the network service and the available relays to yield a pre-configured mesh architecture assigned to that service/relay combination. In another example, the state machine may drive an intelligent network with inputs like network service and relay status, and the intelligent network propagates the inputs and resulting stimulus across the network to yield a pre-configured mesh architecture, modify the current mesh architecture, and/or develop a new mesh architecture. The mesh architecture from the state machine specifies the interconnections between the relays, the connections between the relays and the wireless networks, the access spectrum between the UEs and the relays, the interconnect spectrum between the relays, and the backhaul spectrum between the relays and the networks.

The consensus application in wireless relay 411 directs the RRC in 5GNR relay equipment 446 to use the spectrum and connections that conform to the current mesh architecture. The consensus application in wireless relay 411 transfers commit RPCs to the follower relays that indicate the leader mesh architecture, network service, relay status, leader ID, term ID, index, and commit command. In the follower relays, the consensus applications receive the commit RPCs and responsively commit the log-entry to their state machines. The follower state machines execute based on network service, relay status, and term ID to responsively generate mesh architectures. In the follower relays, the consensus applications compare the leader mesh architecture to their own mesh architecture and report any inconsistencies to the leader. The follower relays user the leader mesh architecture to serve the UEs.

At this point, 5GNR relay 411 and the follower relays make any attachments and detachments needed over the specified spectrum to comply with the current mesh architecture. 5GNR relay 411 wirelessly exchanges data and signaling with the UEs 461 over the user-access spectrum. Wireless relay 411 and relays 462-463 wirelessly exchange data and signaling over the relay-interconnect spectrum. 5GNR relay 411 wirelessly exchanges data and signaling with 5GNR access nodes 464 over the relay-backhaul spectrum.

In some cases, the mesh architecture specifies a hardware-trust requirement. For example, 5GNR relay 411 may select a "financial-transaction" service, and its state machine generates a mesh architecture with a hardware-trust requirement in response to the "financial-transaction" service. In response to the hardware-trust requirement in the mesh architecture, the consensus application in the trusted execution environment of CPU 444 transfers a hardware-trust request (over the open execution environment) to a hardware-trust certificate authority in 5G NFVIs 465. The consensus application receives a random number in return. The trusted execution environment hashes the random number with the hardware-trust code embedded in CPU 444, and the consensus application transfers the hash to the certificate authority. The certificate authority responds with a hardware-trust certificate that indicates hardware-trust for wireless relay 111 during the current term or index. The certificate is signed with the private key of the certificate authority.

The consensus application in the trusted execution environment of CPU 444 transfers its hardware-trust certificate to 5GNR relays 462-463 and also receives hardware-trust certificates from relays 462-463. The trusted execution environments in 5GNR relay 411 and relays 462-463 validate the hardware-trust certificates with the public key for certificate authority 131. The consensus applications report any inconsistencies between their hardware-trust validations and the current mesh architecture to the consensus application in the 5GNR relay 411. The consensus applications stop interacting with wireless devices that fail hardware-trust or that violate the current mesh architecture.

The trusted execution environments may now exchange encrypted data and signaling among each other in the mesh network. In the manner described above, the UEs, wireless access nodes, and NFVIs may also implement trusted execution environments with hardware-trust. The mesh architecture can require hardware-trust with these entities before any trusted interactions are performed.

In some cases, the mesh architecture specifies a relay-update requirement. For example, 5GNR relay 411 may select a "start-up" service, and the state machine generates a mesh architecture with a relay-update requirement in response to the "start-up" service. In response to the relay-update requirement in the mesh architecture, the consensus application in the trusted execution environment of CPU 444 transfers a relay-update request to a relay foundry in 5G NFVIs 465. The consensus application receives software and data updates in return. The consensus application installs the software and data updates in 5GNR gNodeB 441 and/or 5GNR relay equipment 446.

In some cases, the mesh architecture allows relay mobility. For example, 5GNR relay 411 may select a "manufacturing control" service, and the replicated state machine may generate a mesh architecture that supports relay mobility. Without relay mobility in the mesh architecture, the wireless relays would not attempt detachments or accept attachments that differ from the mesh architecture. The mobility feature in the mesh architecture allows designated wireless relays to attempt detachments and attachments that differ from the mesh architecture. The mobility information for the designated mobile relay is reported by the participating relays so the mesh architecture can be updated. The mobility feature may be effectively used during start-up as relays are booted and initially attach to the mesh network.

To support relay mobility, the consensus application in 5GNR relay 411 receives mobility information (relay detachments and attachments plus metadata) from the follower relays in RPC responses.

The consensus application in 5GNR relay 411 enters log-entries to its replicated state machine to implement the new mesh architecture. The consensus application in 5GNR relay 411 transfers entry RPCs to the follower relays that indicate relay status and mobility information, network service, leader ID, term ID, index, and the log-entries to implement the new mesh architecture. The follower relays receive the entry RPCs and enter the log-entries.

The consensus application in 5GNR relay 411 commits the log-entries to its replicated state machine. The leader state machine executes based on relay status, mobility information, selected service, and term ID to responsively generate a mesh architecture that accounts for the relay mobility. In particular, the new mesh architecture specifies the interconnections and spectrum between the mobile relay and the UEs, other relays, and wireless networks.

The consensus application in 5GNR relay 411 transfers commit RPCs to the follower relays that indicate the relay status, mobility information, mesh architecture, leader ID, term ID, index, and commit command. The follower relays receive the commit RPCs and responsively commit the log-entries to their replicated state machines. The state machines execute based on relay status, mobility information, service, and term ID to responsively generate the new mesh architecture. The relay mobility feature may be combined with hardware-trust and/or relay-updates.

In alternative examples, 5GNR relay equipment 446 hosts the consensus application and/or the replicated state machine and operates as described herein for 5GNR circuitry 441.

Figure 5:
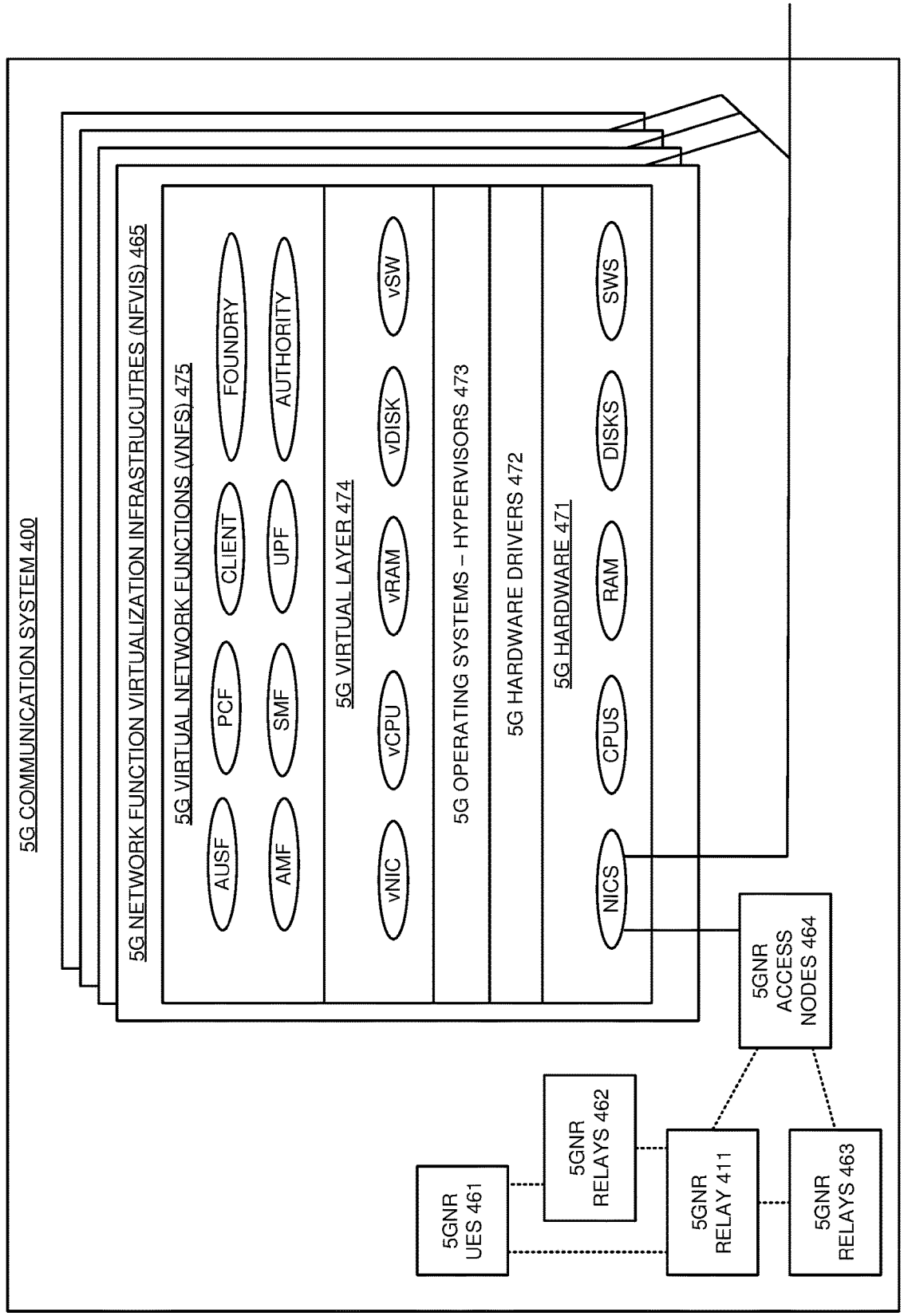
FIG. 5 illustrates a 5G Network Function Virtualization Infrastructure (NFVI) that hosts a hardware-trust authority and a relay-update foundry for the 5GNR wireless relays in the wireless mesh network in the 5G communication system.

FIG. 5 illustrates 5G Network Function Virtualization Infrastructures (NFVI) 465 that host a hardware-trust authority and a relay-update foundry for the 5GNR wireless relays in the wireless mesh network of 5G communication system 400. 5G NFVIs 465 comprise an example of wireless networks 121-122, although networks 121-122 may differ. For clarity, the top one of NFVIs 465 is described and the other NFVIs 465 are similar. 5G NFVIs 465 are interconnected over data communication networks.

The top 5G NFVI 465 comprises 5G hardware 471, 5G hardware drivers 472, 5G operating systems and hypervisors 473, 5G virtual layer 474, and 5G Virtual Network Functions (VNFs) 474. 5G hardware 471 comprises Network Interface Cards (NICs), CPUs, RAM, disk storage, and data switches (SWS). 5G virtual layer 474 comprises virtual NICs (vNIC), virtual CPUs (vCPU), virtual RAM (vRAM), virtual Disk Storage (vDISK), and virtual Switches (vSW). The NICs of 5G NFVIs 465 are linked to each other, to 5GNR access nodes 464, and to other systems.

5G VNFs 475 comprise a hardware-trust certificate authority (AUTHORITY), relay-update foundry (FOUNDRY), Authentication and Security Functions (AUSF), Policy Control Functions (PCF), Unified Data Management (UDM), Access and Mobility Management Functions (AMF), Session Management Functions (SMF), and User Plane Functions (UPF). Other 5G network functions are typically present but are omitted for clarity. 5G hardware 471 executes 5G hardware drivers 472, 5G operating systems and hypervisors 473, 5G virtual layer 474, and 5G VNFs 475 to serve the 5GNR UEs 461 and 5GNR wireless relays 411 and 462-463 over 5GNR access nodes 464.

5G NFVIs 465 implement wireless network slices based on instructions like Service Descriptors (SDs) and Forwarding Graphs (FGs). The wireless network slice instructions indicate 5G VNFs 475 and their interconnections—including the authority and foundry VNFs. 5G VNFs 475 support services for UEs and wireless relays in the wireless network slice. For example, a UPF may exchange user data packets for one of 5GNR UEs 461 between one of 5GNR access nodes 464 and external systems. The SMF controls the UPF per policies in the PCF.

The hardware-trust certificate authority maintains a hardware-trust database for 5GNR relays 411 and 462-463. The hardware-trust database indicates hardware-trust codes and hash algorithms for the wireless relays and possibly other devices in the mesh architecture. The hardware-trust certificate authority receives a hardware-trust request from 5GNR relay 411 and returns a random number. The hardware-trust certificate authority receives a hash of the random number and hardware-trust code from 5GNR relay 411. The certificate authority hashes the same hardware-trust code and random number to match the hash from 5GNR relay 411 and validate hardware-trust. The certificate authority transfers a hardware-trust certificate to 5GNR relay 411. The hardware-trust certificate indicates hardware-trust for relay 411 and is signed with the private key for the certificate authority. In this example, the hardware-trust certificate lasts through the current term. The other relays and devices may obtain hardware-trust certificates in a similar manner.

The relay-update foundry has a database of software and data updates for 5GNR relay 411 and the other relays. The updates may be based on service, term, index, machine request, or some other trigger. For example, 5GNR relay 411 may indicate a "start-up" network service, and the relay-update foundry then downloads relay software and data to support the start-up. The software and data updates may comprise new consensus applications and/or state machines.

Figure 6:
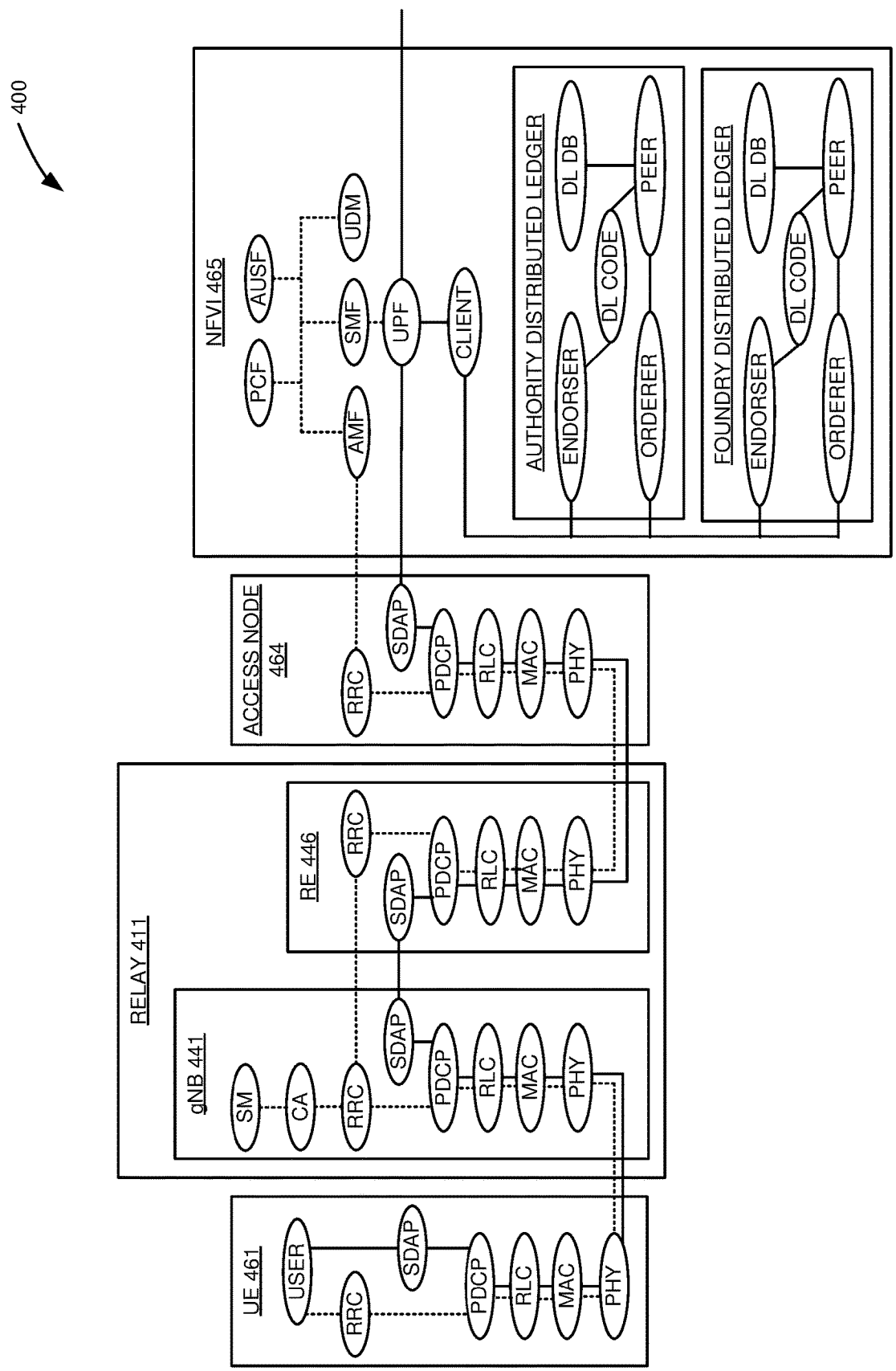
FIG. 6 illustrates the operation of the 5G communication system to serve one of the 5GNR UEs over the wireless mesh network using different mesh architectures.

FIG. 6 illustrates the operation of 5G communication system 400 to serve one of 5GNR UEs 461 over the wireless mesh network using different mesh architectures. For clarity, only a single UE, relay, access node, and NFVI are shown on FIG. 6. In 5G NFVI 465, the certificate authority and the relay foundry VNFs comprises Distributed Ledgers (DLs). The authority and foundry DLs each comprise endorser nodes, orderer nodes, peer nodes, DL code, and DL databases (DB). The authority and foundry DLs comprise multiple geographically-diverse computers that each host DL modules and databases. For clarity on FIG. 6, only one peer node and database is depicted in each DL—the other peer nodes and databases would be hosted by the other NFVIs 465 that are linked over the data communication networks. Additional endorser and orderer nodes could also be hosted by other NFVIs and linked over the data communication networks.

The RRC in Relay Equipment (RE) 446 and the RRC in access node 464 exchange 5GNR RRC/N1 signaling over their respective PDCPs, RLCs, MACs, and PHYs. The RRC in access node 464 and an AMF in 5G NFVIs 465 exchange corresponding 5G N2/N1 signaling. The AMF interacts with RE 446 over N1 signaling and with other VNFs like AUSF and UDM to perform RE authentication and security. The AMF interacts with RE 446 over N1 and with other VNFs like PCF and SMF to perform service selection and Quality-of-Service (QoS) determination. The AMF and SMF select bearers and addresses for the selected service and QoS. In response to bearer and address selection, the SMF transfers N4 signaling to the UPF that indicates the selected bearers, QoS, addresses, and other instructions for the selected service for RE 446. The AMF transfers N2 signaling to the RRC in access node 464 that indicates the selected bearers, QoS, network addresses, and other service instructions for RE 446. The AMF transfers N1 signaling to the RRC in RE 446. The RRC in access node 464 transfers RRC signaling to RE 446 that carries the N1 signaling and that indicates the selected bearers, QoS, network addresses, and other service instructions for RE 446. The RRC in RE 446 configures its SDAP, PDCP, RLC, MAC, and PHY to communicate with access node 464. The RRC in access node 464 configures its SDAP, PDCP, RLC, MAC, and PHY to communicate with RE 446. The SDAP in RE 446 and the SDAP in access node 464 may now exchange SDAP data over their PDCPs, RLCs, MACs, and PHYs. The SDAP in access node 464 and UPFs in NFVI 465 exchange N3 data. The UPFs and external systems exchange corresponding N6 data.

The RRC in UE 461 and the RRC in gNodeB (gNB) 441 exchange 5GNR RRC/N1 signaling over their respective PDCPs, RLCs, MACs, and PHYs. The RRC in gNB 441 and an AMF in 5G NFVIs 465 exchange corresponding 5G N2/N1 signaling over RE 446 and access node 464. The AMF exchanges N1 signaling with UE 461 over relay 411, and access node 464 exchanges 5G signaling with other VNFs like AUSF and UDM to perform UE authentication and security. The AMF exchanges N1 signaling with UE 461 over wireless relay 411 and access node 464 and exchanges 5G signaling with other VNFs like PCF and SMF to perform service selection and QoS determination. The AMF and SMF select bearers and addresses for the selected service and QoS. In response to bearer and address selection, the SMF transfers N4 signaling to a UPF that indicates the selected bearers, QoS, addresses, and other instructions for the selected service for UE 446. The AMF transfers N2 signaling to the RRC in gNB 441 over access node 464 and RE 446 that indicates the selected bearers, QoS, network addresses, and other service instructions for UE 461.

The AMF transfers N1 signaling to the RRC in UE 461 over access node 464 and relay 411. The RRC in gNB 441 transfers RRC signaling to UE 461 that carries the N1 signaling and indicates the selected bearers, QoS, network addresses, and other service instructions for UE 461. The RRC in UE 461 configures its SDAP, PDCP, RLC, MAC, and PHY to communicate with gNB 441. The RRC in gNB 441 configures its SDAP, PDCP, RLC, MAC, and PHY to communicate with UE 461. The SDAP in UE 461 and the SDAP in gNB 441 may now exchange SDAP data over their PDCPs, RLCs, MACs, and PHYs. The SDAP in gNB 441 and the UPF in 5G NFVI 465 exchange N3 data over RE 446 and access node 464. The UPF and external systems exchange corresponding N6 data.

The consensus application (CA) in gNB 441 detects a term time-out and transitions to from follower to candidate. The consensus application transfers election RPCs that indicate a candidate ID, new term ID, and leader election request to the consensus applications in the other wireless relays. A majority of the consensus applications vote for 5GNR relay 411. In 5GNR relay 411, the consensus application receives the votes from the other wireless relays and transitions from candidate to leader. The consensus application transfers heartbeat RPCs to the follower relays that indicate the leader ID, term ID, leader index, and relay status among other data. In the follower relays, the consensus applications respond to heartbeat RPCs with any relay status updates.

The consensus application in relay 411 identifies a network service that will be delivered over the mesh network. The consensus application in relay 411 enters a log-entry for a new mesh architecture. The consensus application transfers entry RPCs to the follower relays that indicate the network service, relay status, leader ID, term ID, index, and one or more log-entries. In the follower relays, the consensus applications receive the entry RPCs and enter the log-entry. The consensus applications respond to the entry RPCs with any status updates.

The consensus application in relay 411 commits the log-entry to the leader state machine (SM). The leader state machine executes based on term ID, relay status, and selected service to determine a mesh architecture. The consensus application in relay 411 directs the RRC in 5GNR gNB 441 to use spectrum and connections that conform to the new mesh architecture. The consensus application directs the RRC in 5GNR RE 446 to use spectrum and connections that conform to the new mesh architecture. The consensus application in relay 411 transfers commit RPCs to the follower relays that indicate the leader mesh architecture, network service, relay status, leader ID, term ID, index, and commit command. In the follower relays, the consensus applications receive the commit RPCs and responsively commit the log-entry to their state machines. The follower state machines execute based on network service, relay status, and term ID to responsively generate mesh architectures. In the follower relays, the consensus applications compare the leader mesh architecture to their own mesh architecture and report any inconsistencies to the leader. The follower relays user the leader mesh architecture to serve the UEs.

At this point, 5GNR relay 411 and the follower relays make any attachments and detachments that are needed over the specified spectrum to conform to the new mesh architecture. 5GNR relay 411 wirelessly exchanges data and signaling with UE 461 over the user-access spectrum. Wireless relay 411 wirelessly exchanges data and signaling and with other wireless relays over the relay-interconnect spectrum. 5GNR relay 411 wirelessly exchanges data and signaling with 5G access nodes 464 over the relay-backhaul spectrum.

In some cases, the mesh architecture specifies a hardware-trust requirement. In response to the hardware-trust requirement in the mesh architecture, the consensus application executes in the trusted execution environment of relay 411 and transfers a hardware-trust request to the DL client in 5G NFVI 465. The DL client returns a random number to the consensus application. The consensus application has the trusted execution environment hash the random number with the hardware-trust code. The consensus application transfers the hash result to the DL client. The DL client transfers the relay ID, hash result, and random number to an endorser node in the certificate authority DL. The endorser node executes its DL code to generate a code result (hardware-trust certificate for relay 411). The endorser node checks the DL code results against an endorsement rule set. The endorser node transfers a transaction endorsement back to the DL client. The DL client transfers the endorsed transaction to an orderer node in the certificate authority DL. The orderer node transfers the endorsed transaction to the appropriate peer nodes. The peer nodes independently execute their DL code to generate results (hardware-trust certificates for relay 411). The peer nodes share their DL code result to form a consensus for the correct result. After consensus, the peer nodes store the transaction data in their DL databases using a blockchain format. A peer node transfers a hardware-trust certificate for 5GNR relay 411 to the consensus application over the DL client. The trusted execution environments in 5GNR relay 411 and the other relays cross-validate their hardware-trust certificates. The consensus applications report any inconsistencies between their hardware-trust validations and the current mesh architecture to the consensus application in 5GNR relay 411. The consensus applications stop interacting with wireless relays and devices that fail hardware-trust or that violate the current mesh architecture.

In some cases, the mesh architecture specifies a relay-update requirement. In response to the relay-update requirement in the mesh architecture, the consensus application in relay 411 transfers a relay-update request to the DL client in 5G NFVI 465. The DL client transfers the relay-update request to an endorser node in the relay foundry DL. The endorser node executes its DL code to generate a result (software update for relay 411). The endorser node checks the DL code results against an endorsement rule set. The endorser node transfers a transaction endorsement back to the DL client. The DL client transfers the endorsed transaction to an orderer node in the certificate authority DL. The orderer node transfers the endorsed transaction to the appropriate peer nodes. The peer nodes independently execute their DL code to generate results (software updates for relay 411). The peer nodes share their DL code results to form a consensus for the correct result. After consensus, the peer nodes store the transaction data in their DL databases using a blockchain format. A peer node directs the DL client to transfer the software update for relay 411 to the consensus application over the DL client. The consensus application installs the software update in 5GNR relay 411.

Advantageously, wireless communication system 400 features a consensus application that efficiently controls wireless relays in a wireless mesh network. Moreover, the consensus application efficiently and effectively uses distributed ledgers to control the wireless relays.

The wireless data network circuitry described above comprises computer hardware and software that form special-purpose network circuitry to control the network architecture of wireless mesh networks. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to control the network architecture of wireless mesh networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless mesh network, the method comprising:
    a leader relay transferring entry Remote Procedure Calls (RPCs) to follower relays that indicate a leader Identifier (ID), term ID, entry index, log-entry, and entry command;
    the follower relays receiving the entry RPCs and responsively entering the log-entry;
    the leader relay committing the log-entry to a leader state machine and responsively generating a leader mesh architecture that indicates user-access spectrum, relay-interconnect spectrum, and relay-backhaul spectrum and responsively transferring commit RPCs to the follower relays that indicate the leader ID, the term ID, commit index, commit command, and the leader mesh architecture;

the follower relays receiving the commit RPCs, committing the log-entry to follower state machines, responsively generating follower mesh architectures that indicate the user-access spectrum, the relay-interconnect spectrum, and the relay-backhaul spectrum, and comparing the generated follower mesh architecture to the leader mesh architecture; and per the leader mesh architecture, the leader relay and the follower relays wirelessly exchanging user data with user devices over the user-access spectrum, wirelessly exchanging at least some of the user data with each other over the relay-interconnect spectrum, and wirelessly exchanging the user data with wireless communication network over the relay-backhaul spectrum.

2. The method of claim 1 further comprising:
at least one of the follower relays notifying the leader relay based on a determination that the leader mesh architecture does not match the follower mesh architecture generated by the at least one of the follower relays.

3. The method of claim 1 further comprising:
the leader relay identifying a network service that will be delivered over the wireless mesh network and wherein the leader relay generating the leader mesh architecture comprises the leader relay generating the leader mesh architecture based on the identified network service; and
the follower relays identifying the network service and wherein the follower relays generating the follower mesh architectures comprises the follower relays generating the follower mesh architectures based on the identified network service.

4. The method of claim 3 wherein the leader relay transferring the entry RPCs to the follower relays comprises transferring the entry RPCs that indicate the network service to the follower relays.

5. The method of claim 3 wherein the leader relay transferring the commit RPCs to the follower relays comprises transferring the commit RPCs that indicate the network service to the follower relays.

6. The method of claim 1 wherein the leader relay was previously a candidate relay and further comprising:
the candidate relay transferring election RPCs that indicate a candidate ID, the term ID, and leader election to the follower relays; and
the follower relays receiving the election RPCs and transferring positive votes for the candidate relay to the candidate relay; and
the candidate relay receiving the positive votes from the follower relays and responsively transitioning from the candidate relay to the leader relay and transferring leader RPCs to the follower relays that indicate the leader ID, the term ID, and a leader index.

7. The method of claim 1 further comprising:
a mobile one of the follower relays detaching from a serving one of the follower relays, attaching to a target one of the follower relays, and responding to the leader relay with mobility information that indicates the detachment and the attachment;
the leader relay receiving the response from the mobile one of the follower relays, entering a new log-entry with the mobility information, committing the new log-entry to the leader state machine, and generating a new leader mesh architecture based on the mobility information; and
the follower relays entering the new log-entry with the mobility information, committing the new log-entry to the follower state machines, and generating new follower mesh architectures based on the mobility information.

8. The method of claim 1 further comprising:
a leader relay obtaining a hardware-trust certificate from a certificate authority based on a read-only hardware-trust code that is physically embedded in the leader relay and wherein the leader relay transferring the entry RPCs and the commit RPCs to the follower relays comprises transferring the entry RPCs and the commit RPCs that indicate the hardware-trust certificate; and
the follower relays validating the hardware-trust certificate based on a key for the certificate authority and wherein the follower relays entering and committing the log-entry comprises entering and committing the log-entry only when the hardware-trust certificate from the leader relay is currently valid.

9. The method of claim 1 further comprising:
the follower relays obtaining hardware-trust certificates from a certificate authority based on read-only hardware-trust codes that are physically embedded in the follower relays and transferring the hardware-trust certificates to the leader relay; and
the leader relay validating the hardware-trust certificates based on a key for the certificate authority and wherein the leader relay transfers the entry and commit RPCs to one of the follower relays only when the hardware-trust certificate from the one of the follower relays is currently valid.

10. The method of claim 1 further comprising:
the follower relays obtaining hardware-trust certificates from a certificate authority based on read-only hardware-trust codes that are physically embedded in the follower relays and transferring the hardware-trust certificates to interconnected ones of the relays; and
the interconnected ones of the relays validating the hardware-trust certificates based on a key for the certificate authority and reporting inconsistencies between the hardware-trust validations and the leader mesh architecture to the leader relay.

11. A wireless mesh network comprising:
a leader relay configured to transfer entry Remote Procedure Calls (RPCs) to follower relays that indicate a leader Identifier (ID), term ID, entry index, log-entry, and entry command;
the follower relays configured to receive the entry RPCs and entering the log-entry;
the leader relay configured to commit the log-entry to a leader state machine and responsively generate a leader mesh architecture that indicates user-access spectrum, relay-interconnect spectrum, and relay-backhaul spectrum and responsively transfer commit RPCs to the follower relays that indicate the leader ID, the term ID, commit index, commitment command, and the leader mesh architecture;
the follower relays configured to receive the commit RPCs, commit the log-entry to follower state machines, responsively generate follower mesh architectures that indicate the user-access spectrum, the relay-interconnect spectrum, and the relay-backhaul spectrum, and compare the generated follower mesh architecture to the leader mesh architecture; and per the leader mesh architecture, the leader relay and the follower relays configured to wirelessly exchange user data with user devices over the user-access spectrum, wirelessly exchange at least some of the user data with each other over the relay-interconnect spectrum, and wirelessly exchange the user data with wireless communication network over the relay-backhaul spectrum.

12. The wireless mesh network of claim 11 further comprising:
at least one of the follower relays configured to notify the leader relay based upon a determination that the leader mesh architecture does not match the follower mesh architecture generated by the at least one of the follower relays.

13. The wireless mesh network of claim 11 further comprising:
the leader relay configured to identify a network service that will be delivered over the wireless mesh network and wherein the leader relay is configured to generate the leader mesh architecture based on the identified network service; and
the follower relays configured to identify the network service and wherein the follower relays are configured to generate the follower mesh architectures based on the identified network service.

14. The wireless mesh network of claim 13 wherein the leader relay is configured to transfer the entry RPCs that indicate the network service to the follower relays.

15. The wireless mesh network of claim 13 wherein the leader relay is configured to transfer the commit RPCs that indicate the network service to the follower relays.

16. The wireless mesh network of claim 11 wherein the leader relay was previously a candidate relay and further comprising:
the candidate relay configured to transfer election RPCs that indicate a candidate ID, the term ID, and leader election to the follower relays;
the follower relays configured to receive the election RPCs and transfer positive votes for the candidate relay to the candidate relay; and
the candidate relay configured to receive the positive votes from the follower relays, responsively transition from the candidate relay to the leader relay, and transfer leader RPCs to the follower relays that indicate the leader ID, the term ID, and a leader index.

17. The wireless mesh network of claim 11 further comprising:
a mobile one of the follower relays configured to detach from a serving one of the follower relays, attach to a target one of the follower relays, and respond to the leader relay with mobility information that indicates the detachment and the attachment;
the leader relay configured to receive the response from the mobile one of the follower relays, enter a new log-entry with the mobility information, commit the new log-entry to the leader state machine, and generate a new leader mesh architecture based on the mobility information; and
the follower relays configured to enter the new log-entry with the mobility information, commit the new log-entry to the follower state machines, and generate new follower mesh architectures based on the mobility information.

18. The wireless mesh network of claim 11 further comprising:
a leader relay configured to obtain a hardware-trust certificate from a certificate authority based on a read-only hardware-trust code that is physically embedded in the leader relay and transfer the entry RPCs and the commit RPCs that indicate the hardware-trust certificate; and
the follower relays configured to validate the hardware-trust certificate based on a key for the certificate authority and wherein the follower relays are configured to enter and commit the log-entry only when the hardware-trust certificate from the leader relay is currently valid.

19. The wireless mesh network of claim 11 further comprising:
the follower relays configured to obtain hardware-trust certificates from a certificate authority based on read-only hardware-trust codes that are physically embedded in the follower relays and transfer the hardware-trust certificates to the leader relay; and
the leader relay configured to validate the hardware-trust certificates based on a key for the certificate authority and configured to transfer the entry and commit RPCs to one of the follower relays only when the hardware-trust certificate from the one of the follower relays is currently valid.

20. The wireless mesh network of claim 11 further comprising:
the follower relays configured to obtain hardware-trust certificates from a certificate authority based on read-only hardware-trust codes that are physically embedded in the follower relays and transfer the hardware-trust certificates to interconnected ones of the relays; and
the interconnected ones of the relays configured to validate the hardware-trust certificates based on a key for the certificate authority and report inconsistencies between the hardware-trust validations and the leader mesh architecture to the leader relay.

* * * * *